United States Patent Office 3,430,422
Patented Mar. 4, 1969

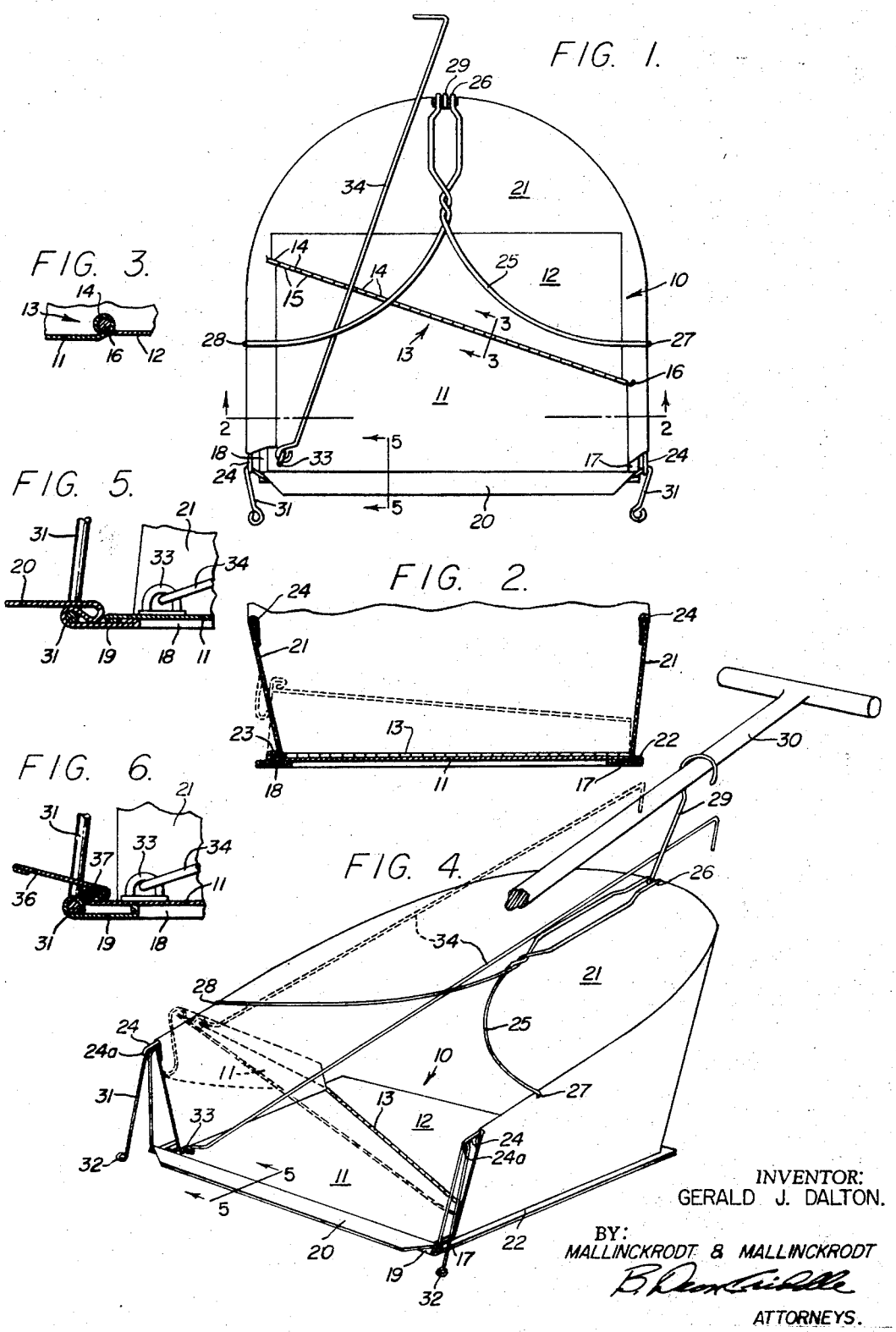

3,430,422
GRASS CATCHER
Gerald J. Dalton, 459 North 250 East,
Kaysville, Utah 84037
Filed Aug. 17, 1966, Ser. No. 573,076
U.S. Cl. 56—202     5 Claims
Int. Cl. A01d 35/22, 53/06

Catchers for the clipping resulting from the use of reel type lawn mowers have long been known. These have taken various forms, but the most popular ones have been collapsible, with a rigid bottom, a wire framework that includes means for attaching to a lawn mower adjacent the rear rollers thereof, a wall portion of canvas or other flexible material and a hangar for suspending the rearmost portion of the wall from the lawn mower handle.

In using these previously known catchers it has either been necessary to empty them with undesirable frequency or to frequently push the clippings to the rear of the catcher and, since the lawn mowers usually throw the clippings to one side, to distribute them throughout the catcher. Once the clippings begin to accumulate in the catcher, bumps, speed changes, etc., all tend to discharge the accumulated clippings from the front of the catcher, even if they have been previously pushed to the rear and distributed throughout the catcher.

There are certain dangers inherent in the user's moving the clippings into or around inside the catcher, for unless the power to the reel is cut off it is very easy to catch clothing or fingers in the operating reel.

It is an object of the present invention to provide a catcher for grass and other clippings that can be used with reel type lawn mowers in complete safety and that will not require a user to reach into the catcher to move clippings to the rear or to evenly distribute the clippings in order to reduce the frequency with which the catcher must be unloaded. In accomplishing these objects I have also reduced the bending and unloading effort heretofore required in connection with such catchers, and since the frequency of unloading is reduced I have shortened the time necessary for mowing operations. I have also made it possible for a user to more easily back the mower without its overrunning the catcher.

The principal feature of my invention is the provision of a pivoted bottom section that can be readily operated from a location adjacent the handle of a lawn mower to move clippings to the rear and distribute them evenly throughout the catcher while also serving to loosen clippings packed into the catcher when it is emptied. By using the pivoted section to take weight off the catcher as the lawn mower is backed the catcher easily moves ahead of the mower and is not overrun.

While the invention is here particularly described as a catcher for use with reel type lawnmowers it will be appreciated that power rakes and powered broom sweepers could as well be advantageously used with a catcher of the type disclosed.

There are shown in the accompanying drawings specific embodiments of the invention representing what are presently regarded as the best modes of carrying out the generic concepts in actual practice. From the detailed description of these presently preferred forms of the invention, other more specific objects and features will become apparent.

In the drawings:

FIG. 1 is a top plan view of a grass catcher in accordance with the invention;

FIG. 2, a fragmentary vertical section taken on the line 2—2 of FIG. 1, with the hinged bottom shown raised in dotted lines;

FIG. 3, another fragmentary vertical section on an enlarged scale taken on the line 3—3 of FIG. 1;

FIG. 4, a perspective view of the grass catcher, with the bottom shown in raised position by dotted lines;

FIG. 5, a fragmentary vertical section on an enlarged scale taken on the line 5—5 of FIG. 4; and FIG. 6, a view like FIG. 5, but showing another embodiment of the grass catcher.

Referring now to the drawings:

In the illustrated preferred embodiment shown in FIGS. 1–5, the grass catcher includes a bottom 10 that is made of a forward section 11 and a rear section 12 interconnected by a hinge 13 extending diagonally across the catcher.

Hinge 13 is preferably formed by rolling tabs 14 at the back edge of the forward section up and back toward the front edge of the catcher and tabs 15 at the front edge of the rear section up and toward the rear of the catcher and by inserting a stiff wire 16 through the aligned rolled tabs. With this construction, no sharp edges of the rear section are exposed beneath the catcher to engage uneven terrain, rocks, etc.

Rear section 12 of bottom 10 includes forwardly extending arms 17 and 18 at opopsite sides of the catcher and a cross-member 19 that extends between the arms at the front of the catcher. The forward section 11 of the bottom rests on the arms 17 and 18 and the cross-member 19.

A lip 20 that extends outwardly and slightly upwardly from cross-member 19 holds clippings in the catcher and also serves as a guide surface that readily slides the catcher over small obstacles.

A wall 21, made of canvas or other suitable flexible material extends around the sides and rear of the catcher. The lower edges of the wall is anchored to the arm 17 and the rear section of the catcher by an inturned edge 22, but is anchored to the forward section 11 by an inturned edge 23 along the length of arm 18.

A generally U-shaped wire 24 having eyes 24a formed at its ends is passed through a seamed upped edge of the wall to reinforce it and to hold the wall open so that clippings can enter the catcher. Wire 24 is then reinforced and held in its spread condition by a wire 25 that is bent at 26 around wire 24 at the rear of th ecatcher and that has its ends connected at 27 and 28 to the legs of the U-shaped wire 24.

A hook 29 is loosely connected to wire 24 at its rear connection with wire 25 and is adapted to be placed over the rearwardly projecting handle 30 of a lawn mower, shown fragmentarily.

Another wire 31 extends through cross-member 19, up through eyes 24a and back down to be formed into loops 32 that are adapted to be fitted on projections provided for the purpose adjacent the rear rollers of a lawn mower.

A bracket 33 is fixed to the top surface of forward section 11 and an operating handle 34, which may also be constructed, of a length of stiff wire is connected thereto. The handle extends rearwardly over the back of the catcher to be conveniently gripped by the user thereof.

In use, the catcher is affixed to the lawn mower in the usual fashion. Loops 32 are placed over projections adjacent the rear rollers of the lawn mower and hook 29 is placed over the lawn mower handle. Periodically, as the clippings are accumulated in the catcher, the operator will pull back on handle 33 to pivot the forward section 11 of bottom 10 about hinge 13. All clippings on the forward section are thus pushed to the rear of the catcher, and, because of the diagonal arrangement of the hinge, they are moved from the portion of the catcher where they most rapidly accumulate and are more evenly distributed across the entire catcher.

In the illustrated form, the catcher is intended to be used with a reel-type lawn mower that throws clippings to the right rear of the catcher. Naturally for a lawn mower that throws clippings to the left rear of the catcher, the hinge should extend diagonally from the vicinity of the left rear corner of the catcher (as viewed from above) toward the right front corner.

The relative sizes of the forward and rear sections of the bottom are a matter of design choice, but it has been found highly advantageous to make the forward section considerably larger than the rear section.

In some cases it may be desirable to use a hinge that is extended straight across the bottom rather than diagonally, as disclosed. In this instance, there is still an effective movement of clippings to the rear of the catcher, but the distribution of clippings is not so effective. Obviously, such an arrangement is very satisfactory for use with sweepers or other devices that do not throw clippings to one side or the other of the catcher.

Jerking on handle 34 even more effectively moves the clippings as the vibratory action imparted to the forward section 11 tends to shake them into desired position. Because the flexible wall is connected to the long side of the forward section the clippings cannot fall from the side as the forward section is raised. The wall can be similarly connected to the short side of the forward section, but this has not been found necessary since, as the forward portion is raised, this edge stays close to the wall and clippings cannot fall therefrom.

Should the user desire to back the lawn mower, a slight pull on handle 34 will raise the forward section 11 sufficiently to take the weight of the grass thereon off the catcher. The catcher then glides ahead of the backing lawn mower and is not overrun.

When clippings are being dumped from the catcher movement of handle 34 and forward plate 11 shakes the clippings loose and even if they are wet and compacted in the catcher they are easily removed.

As illustrated in FIG. 6, it is also possible to make the forwardly extending lip, here designated 36, integral with the forward section 11 of the bottom. This can be done, for example, by extending the bottom section and by shaping it around a reinforcement wire 37. The forward section then rests on the arms 17 and 18 and crossmember 19 in the manner disclosed in FIGS. 1–5.

Whereas there is here illustrated and specifically described certain preferred constructions of apparatus which are presently regarded as the best modes of carrying out the invention, it should be understood that various changes may be made and other constructions adopted without departing from the inventive subject matter particularly pointed and claimed herebelow.

I claim:
1. A grass catcher comprising:
    an enclosure having an open front and top;
    a bottom having a movable forward section and a fixed rear section;
    hinge means interconnecting said movable section and said fixed section; and
    an operating handle formed of a stiff rod having one of its ends pivotally connected to the top of said movable section and extending rearwardly from said connection above the said fixed section and beyond said enclosure.
2. A grass catcher according to claim 1, wherein:
    the hinge extends diagonally from a point at one side and adjacent the rear of the enclosure to the opposite side at a location more remote from the rear of the enclosure.
3. A grass catcher according to claim 2, wherein:
    the enclosure includes a wall of flexible material.
4. A grass catcher according to claim 3, wherein:
    at least a portion of one side of the wall of flexible material is fixed to the movable section and is carried thereby;
    the remainder of said wall of flexible material being connected to the fixed section.
5. A grass catcher according to claim 4, wherein:
    the fixed section further includes a lip, extending across the open front of the enclosure and projecting outwardly and upwardly therefrom.

References Cited

UNITED STATES PATENTS

| | | | |
|---|---|---|---|
| 359,550 | 3/1887 | Williams | 56—198 |
| 829,943 | 9/1906 | Boss | 56—199 |
| 1,588,148 | 6/1926 | Schryver | 56—199 |
| 1,999,102 | 4/1935 | Kirby | 56—199 |
| 2,067,916 | 1/1937 | Haffner et al. | 56—199 |
| 2,300,934 | 11/1942 | Kircher | 56—199 |
| 2,668,411 | 2/1954 | Kircher | 56—199 |
| 2,712,720 | 7/1955 | Kircher | 56—199 |

RUSSELL R. KINSEY, *Primary Examiner.*